Jan. 18, 1938.                A. HEWITT                 2,106,003
                             TERMINAL BOX
                         Filed March 14, 1936
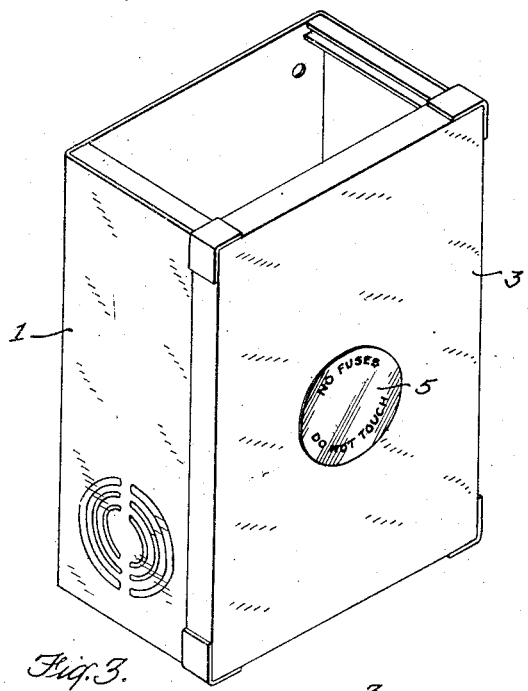
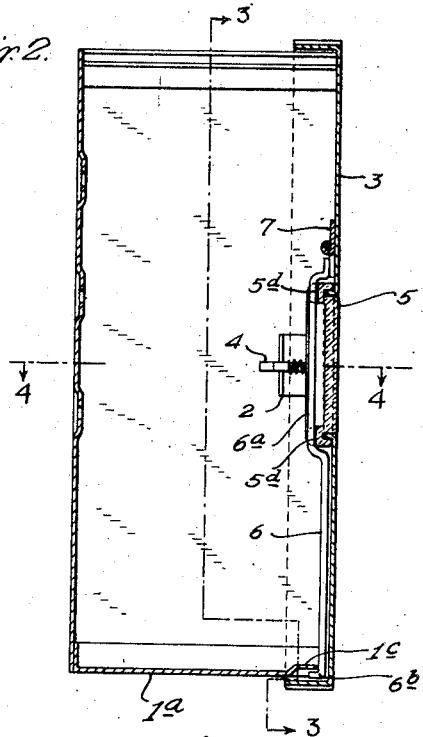
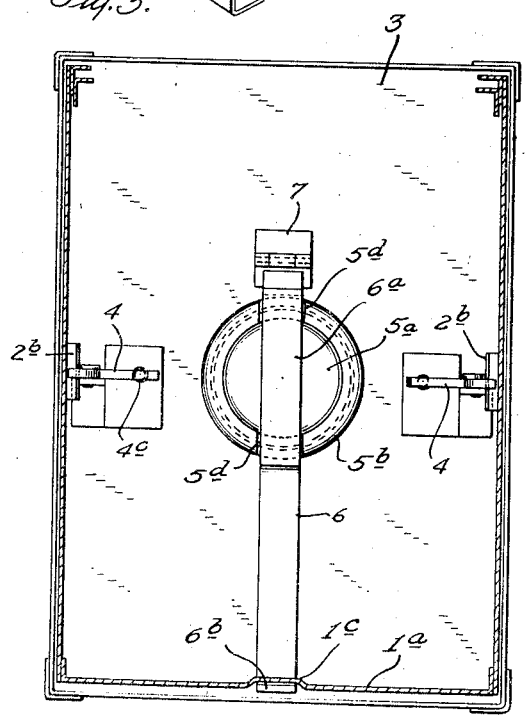
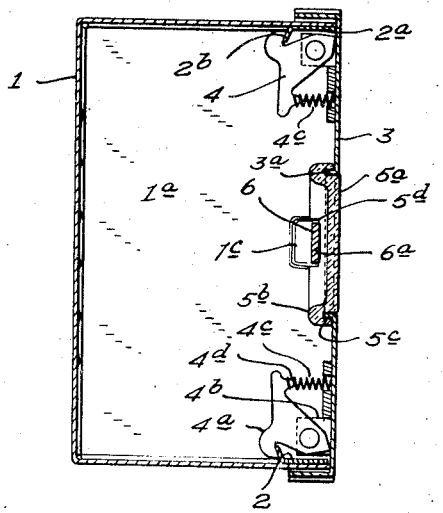
INVENTOR
Alfred Hewitt
BY
George T. Gill
ATTORNEY Patented Jan. 18, 1938

2,106,003

UNITED STATES PATENT OFFICE 2,106,003

TERMINAL BOX

Alfred Hewitt, Jamaica, N. Y., assignor to Metropolitan Device Corporation, a corporation of New York Application March 14, 1936, Serial No. 68,844

6 Claims. (Cl. 220—55)

The invention herein disclosed relates to an electrical terminal box that is particularly suitable as a box for meter connections.

In electrical installations, it has been found desirable to so enclose the meter connections that while they are readily accessible to authorized agents of the power supply company, they are not accessible to others. Various expedients have heretofore been devised for this purpose including terminal boxes having a latch for locking the cover in its closed position on the box, the latch being inaccessible from the exterior of the box except through an opening that is normally closed by a frangible seal or closure. It is to this type of terminal box that this invention relates and it is an object of the invention to provide a terminal box of this type that is simple and comparatively inexpensive to manufacture, that is so constructed as to permit the frangible insert to be readily and easily replaced and in which the frangible seal is firmly and securely held in place and renders the latch completely inaccessible when the cover is in position on the box.

In accordance with the invention, there is provided a sheet metal terminal box and a cover therefor. Spring-pressed latches are provided for securing the cover on the box and these latches are inaccessible when the cover is on the box except through an opening in the cover of the box. This opening is normally closed by a frangible insert that is held in place such that it cannot be removed from the opening when the cover is in position on the box. By breaking this frangible insert, the latches may be released and the cover removed. The frangible insert is readily replaced and becomes locked in place by the act of putting the cover on the box.

Such a box is disclosed in the accompanying drawing in which:

Fig. 1 is an isometric of the box;

Fig. 2 is a central, longitudinal section thereof;

Fig. 3 is a section taken along the line 3—3 of Fig. 2 and showing a plan of the inside of the cover; and Fig. 4 is a transverse section taken along the line 4—4 of Fig. 2.

The terminal box 1 shown in the drawing is a sheet metal box open at one end to receive the end of a meter which extends through the open end and into the interior of the box so that the meter wires are entirely within the box. At the longitudinal center of the box there is secured to the inner surface of each side wall of the box, a sheet metal strip 2. The strips 2 are mounted adjacent the edges of the side wall of the box and each strip includes a section 2a lying against the inner surface of the side wall and secured thereto as by welding and a section 2b extending at an angle to the side wall, the section 2b being inclined inwardly of the box. The end wall 1a of the box has a depression 1c formed therein for a purpose that will hereinafter appear.

In conjunction with the box 1, there is a sheet metal cover 3 having an opening through the center thereof, the edge of the opening being bent inwardly to form a circular flange 3a. On each side of the opening through the cover there is a latch 4 positioned to cooperate with the strips 2 on the sides of the box. Each latch includes a hook-shaped latch member 4a pivotally mounted on a bracket 4b secured to the inner surface of the cover and positioned so that the latch engages the section 2b of a strip 2. A spring 4c, acting between the cover of the box and the latch, resiliently urges the latch in a direction to engage the extension 2b. One end of the spring is received in an opening in the bracket and the other end surrounds an extension 4d on the latch. The edge of the latch is shaped so that when the cover is placed on the box the latch swings about its pivot to pass the section 2b of the strip 2. The spring then returns the latch to engage the section 2b and it can only be released by a force acting in opposition to the spring 4c. By these latches 4, the cover is firmly secured on the box.

The latches 4 are accessible through the opening in the cover of the box. One may insert one's fingers through this opening and release the latches and thus remove the cover. The opening through the cover is, however, normally closed by a frangible seal or insert 5. The insert 5 is circular and includes a cylindrical section 5a closed at the end, which extends into the opening and substantially flush with the outer surface of the cover, and a circular flange 5b that engages the inner surface of the cover. The flange 5b is provided with a circular groove 5c that receives the flange 3a formed by turning in the edge of the opening through the cover.

The frangible closure 5 is held in place closing the opening through the cover by a strap 6. One end of the strap 6 is pivoted to a bracket 7 secured to the inner surface of the cover at one side of the opening through the cover. The strap 6 extends longitudinally of the cover, transversely of the opening through the cover, and includes an offset section 6a provided for the flange of the frangible insert 5. The free end of the strap is bent at right angles to form a flange 6b that extends over the edge of the end wall 1a of the box and is received in the depression 1c provided therefor. This end section or flange 6b is covered by the edge of the cover 3. Thus, when the cover is in place on the box, the strap 6 firmly holds the frangible closure 5 in the opening through the cover. When the frangible closure is broken, one may insert one's fingers on each side of the strap and so release the latches 4. To replace a frangible closure, when the cover is removed, it is merely necessary to swing the strap 6 about its pivotal mounting, insert the frangible insert and move the strap against the cover. On placing the cover on the box the frangible closure is locked in place.

The flange 5b of the closure 5 is provided with diametrical grooves 5d that receive the strap 6. The strap within the grooves prevents the closure from turning in the opening in the cover.

The construction disclosed provides a very satisfactory arrangement both from the standpoint of manufacture and preventing the meter connections from being tampered with.

It will be obvious that various changes may be made by those skilled in the art in the details of the embodiment of the invention illustrated in the drawing and described in detail above within the principle and scope of the invention as expressed in the appended claims.

I claim:

1. In a box and cover construction having an opening therethrough and a latch accessible through the opening for securing the cover on the box, the combination comprising a frangible insert including a section received in the opening and a flange abutting against the inner surface of the wall surrounding the opening, the flange having a diametrical groove therein, and a strap of less width than the frangible insert extending transversely of the opening for securing the frangible insert within the opening, the strap being of such width as to be received within the groove of the frangible insert.

2. In a box and cover construction having an opening therethrough and a latch accessible through the opening for securing the cover on the box, the combination comprising a frangible insert including a section received in the opening and a flange abutting against the inner surface of the wall surrounding the opening, and a strap of less width than the opening pivotally secured at one end to the inner surface of the wall having the opening therethrough and extending transversely of the opening for securing the frangible insert within the opening, the strap being of such length as to be secured in place by the edge of the box.

3. A cover for a terminal box comprising a sheet metal cover having an opening therethrough, a lateral flange defining the opening through the cover and extending from the inner surface thereof, and a frangible insert including a section received in the opening and a flange abutting against the inner surface of the cover, the flange having a groove therein to receive the lateral flange defining the opening through the cover, and means for retaining the frangible insert in position in the opening through the cover.

4. A cover for a terminal box comprising a sheet metal cover having an opening therethrough, a lateral flange defining the opening through the cover and extending from the inner surface thereof, a frangible insert including a section received in the opening and a flange abutting against the inner surface of the cover, the flange having a groove therein to receive the lateral flange defining the opening through the cover, and a strap of less width than the frangible insert extending transversely of the opening and engaging the flange of the frangible insert.

5. A cover for a terminal box comprising a sheet metal cover having an opening therethrough, and means for retaining a frangible insert in position in the opening comprising a strap of less width than the opening pivotally secured at one end to the inner surface of the cover, extending transversely of the opening through the cover and to the opposite end thereof.

6. A sheet metal box of the type described comprising side walls and a bottom, one of the side walls having a depression adjacent the edge thereof, a cover for the box having an opening therethrough, a frangible insert for the opening in the cover including a section received in the opening and a flange abutting against the inner surface of the cover, and a strap of less width than the opening extending transversely of the cover for securing the frangible insert in the opening in the cover, the end of the strap extending at a right angle to the strap and over the edge of the side wall of the box, the angular extension of the strap being received in the depression in the side wall of the box.

ALFRED HEWITT.